(12) United States Patent
Roy et al.

(10) Patent No.: US 11,796,705 B2
(45) Date of Patent: Oct. 24, 2023

(54) SYSTEM AND METHOD FOR SEISMIC INVERSION

(71) Applicant: Chevron U.S.A. Inc., San Ramon, CA (US)

(72) Inventors: Prasenjit Roy, Houston, TX (US); Xinfa Zhu, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 290 days.

(21) Appl. No.: 17/223,364

(22) Filed: Apr. 6, 2021

(65) Prior Publication Data

US 2021/0311223 A1    Oct. 7, 2021

Related U.S. Application Data

(60) Provisional application No. 63/006,583, filed on Apr. 7, 2020.

(51) Int. Cl.
*G01V 1/50* (2006.01)
*G06N 20/00* (2019.01)
*G01V 1/28* (2006.01)
*G01V 1/30* (2006.01)

(52) U.S. Cl.
CPC .............. *G01V 1/50* (2013.01); *G01V 1/282* (2013.01); *G01V 1/307* (2013.01); *G06N 20/00* (2019.01); *G01V 2210/632* (2013.01)

(58) Field of Classification Search
USPC ............................................. 702/2
See application file for complete search history.

(56) References Cited

U.S. PATENT DOCUMENTS

| 2006/0004521 | A1* | 1/2006 | Bankhead | G01V 1/28 702/14 |
| 2011/0083844 | A1* | 4/2011 | Oppert | G01V 1/30 703/2 |
| 2011/0103187 | A1 | 5/2011 | Albertin | |
| 2014/0278115 | A1* | 9/2014 | Bas | G01V 99/005 702/14 |

(Continued)

OTHER PUBLICATIONS

PCT International Search Report and Written Opinion, dated Nov. 6, 2021, issued in International Application No. PCT/IB2021/052828, filed on Apr. 6, 2021, 14 pages.

(Continued)

*Primary Examiner* — Paul D Lee
(74) *Attorney, Agent, or Firm* — Marie L. Clapp (57) ABSTRACT

A method is described for inverting seismic data including obtaining well logs representative of subsurface volumes of interest; generating an amplitude variation with angle (AVA) database from the well logs by seismic modeling, wherein the seismic modeling is performed a plurality of times for all combinations of fluid substitutions of brine, oil, and gas and low porosity, mid-porosity, and high porosity; generating a trained AVA model using the AVA database; obtaining a seismic dataset; calibrating the seismic dataset; computing seismic attributes for the calibrated seismic dataset using statistics for AVA classification; and generating direct hydrocarbon indicators as a function of position in the subsurface volume of interest by applying the trained AVA model to the seismic attributes. The method is executed by a computer system.

16 Claims, 12 Drawing Sheets

(56) References Cited

U.S. PATENT DOCUMENTS

| | | | |
|---|---|---|---|
| 2016/0209531 A1* | 7/2016 | Bornhurst | G01V 1/307 |
| 2018/0106917 A1* | 4/2018 | Osypov | G01V 1/003 |
| 2018/0128929 A1 | 5/2018 | Roy | |
| 2018/0329096 A1 | 11/2018 | Magill | |
| 2019/0041534 A1* | 2/2019 | Bandura | G01V 99/005 |
| 2020/0041677 A1 | 2/2020 | Roy | |
| 2020/0301036 A1* | 9/2020 | Ramfjord | G01V 1/50 |

OTHER PUBLICATIONS

Kamal Hami-Eddine et al., "Neural Networks to Quantify the Pertinence of AVA Effects," Technical Article, Geophysical Society of Houston, Apr. 2016, pp. 11-15.

* cited by examiner

SYSTEM AND METHOD FOR SEISMIC INVERSION

CROSS-REFERENCE TO RELATED APPLICATIONS

This application claims the benefit of U.S. Provisional Patent Application 63/006,583 filed Apr. 7, 2020.

STATEMENT REGARDING FEDERALLY SPONSORED RESEARCH OR DEVELOPMENT

Not applicable.

TECHNICAL FIELD

The disclosed embodiments relate generally to techniques for inverting seismic data representative of subsurface reservoirs to obtain a model of the subsurface and, in particular, to a method of inverting seismic data using machine learning to generate direct hydrocarbon indicators.

BACKGROUND

During drilling wells, sensors are sent down the borehole to record various signals from the geological formations (e.g., electrical, sonic, neutron, gamma ray, etc.). These signals are processed and recorded as one-dimensional logs. These well logs contain information about the geological formation as recorded at the open borehole. They provide ground truth as these are more direct information that we can measure from the earth's surface. They provide information such as type of lithology, pore fluid, porosity, density, etc. of the formation. The sonic, shear and density well logs can be utilized to create synthetic seismic data by forward modeling using exact Zoeppritz equation. The well log information is spatially sparse as they are limited by the location of drilled wells. To make inference about lithology or pore fluid between the wells, we traditionally use seismic data. The synthetic seismic based on well logs are compared against measured seismic data to make inference about geological formations and rock properties.

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data can be inverted to generate subsurface models of physical properties and processed to create seismic images that can be interpreted to identify subsurface geologic features including hydrocarbon deposits. Seismic inversion is technically challenging, time consuming, expensive and requires significant manual input. Traditional inversion methods can only use a limited set of drilled well data if available in the study area and is not effective in the frontier exploration where there are no drilled wells.

The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for faster, more accurate seismic inversion that will allow better seismic interpretation of potential hydrocarbon reservoirs.

SUMMARY

In accordance with some embodiments, a method for seismic inversion is disclosed. The method includes obtaining well logs representative of subsurface volumes of interest; generating an amplitude variation with angle (AVA) database from the well logs by seismic modeling, wherein the seismic modeling is performed a plurality of times for all combinations of fluid substitutions of brine, oil, and gas and low porosity, mid-porosity, and high porosity; generating a trained AVA model using the AVA database; obtaining a seismic dataset; calibrating the seismic dataset; computing seismic attributes for the calibrated seismic dataset using statistics for AVA classification; and generating direct hydrocarbon indicators as a function of position in the subsurface volume of interest by applying the trained AVA model to the seismic attributes In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of seismic inversion. These embodiments are designed to be of particular use for seismic inversion of subsurface volumes in frontier exploration areas.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention includes embodiments of a method and system for machine-learning assisted seismic inversion to estimate lithology, fluid type and porosity directly from seismic data. The method uses all available good quality well-derived seismic models to generate a training dataset for the machine-learning algorithm.

When predicting reservoir properties such as porosity and fluid type from seismic data, it is important to have good quality seismic data. The quality of seismic data is impacted by issues such as gather flatness, variable frequency across angle ranges, errors in calibration, errors in wavelet estimation, and characteristics of the wavelets like side lobes. The efficiency and accuracy of conventional seismic inversion processes is impacted by the need for manual intervention and strong prior information and/or accurate starting models. When considering using machine-learning for seismic inversion, the challenges are that it requires high quality training data, a large number of data as training samples, and the training is labor intensive and expensive.

Figure 1:
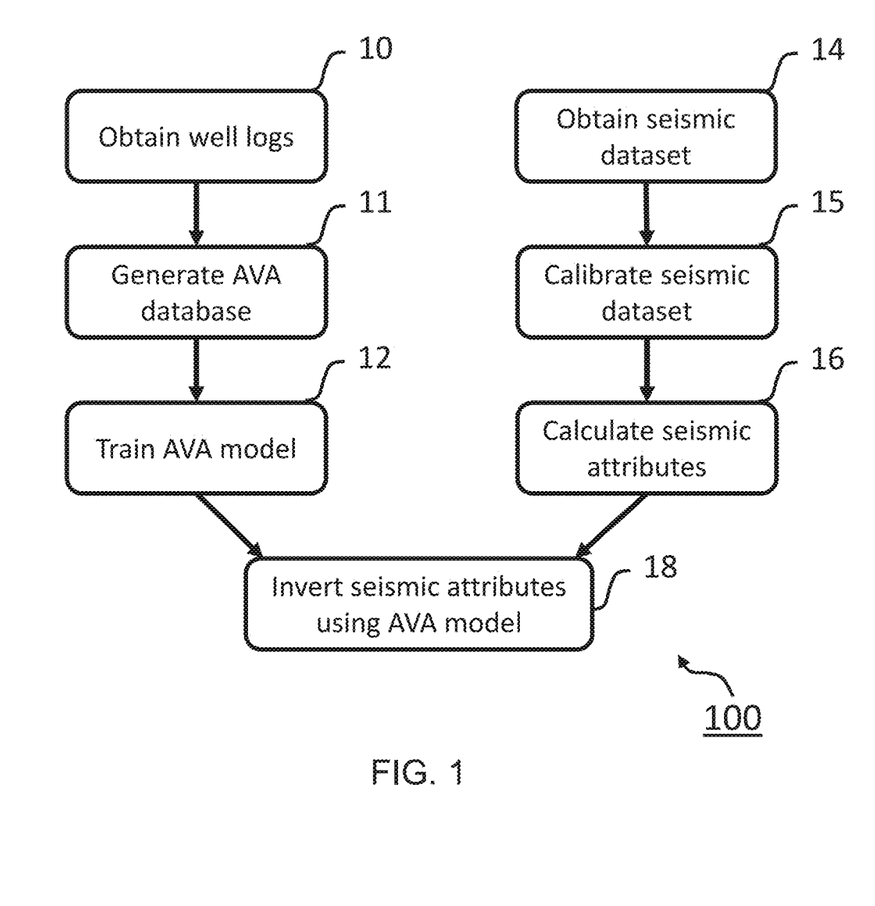
FIG. 1 is a flowchart illustrating steps of a method of seismic inversion.
Figure 2:
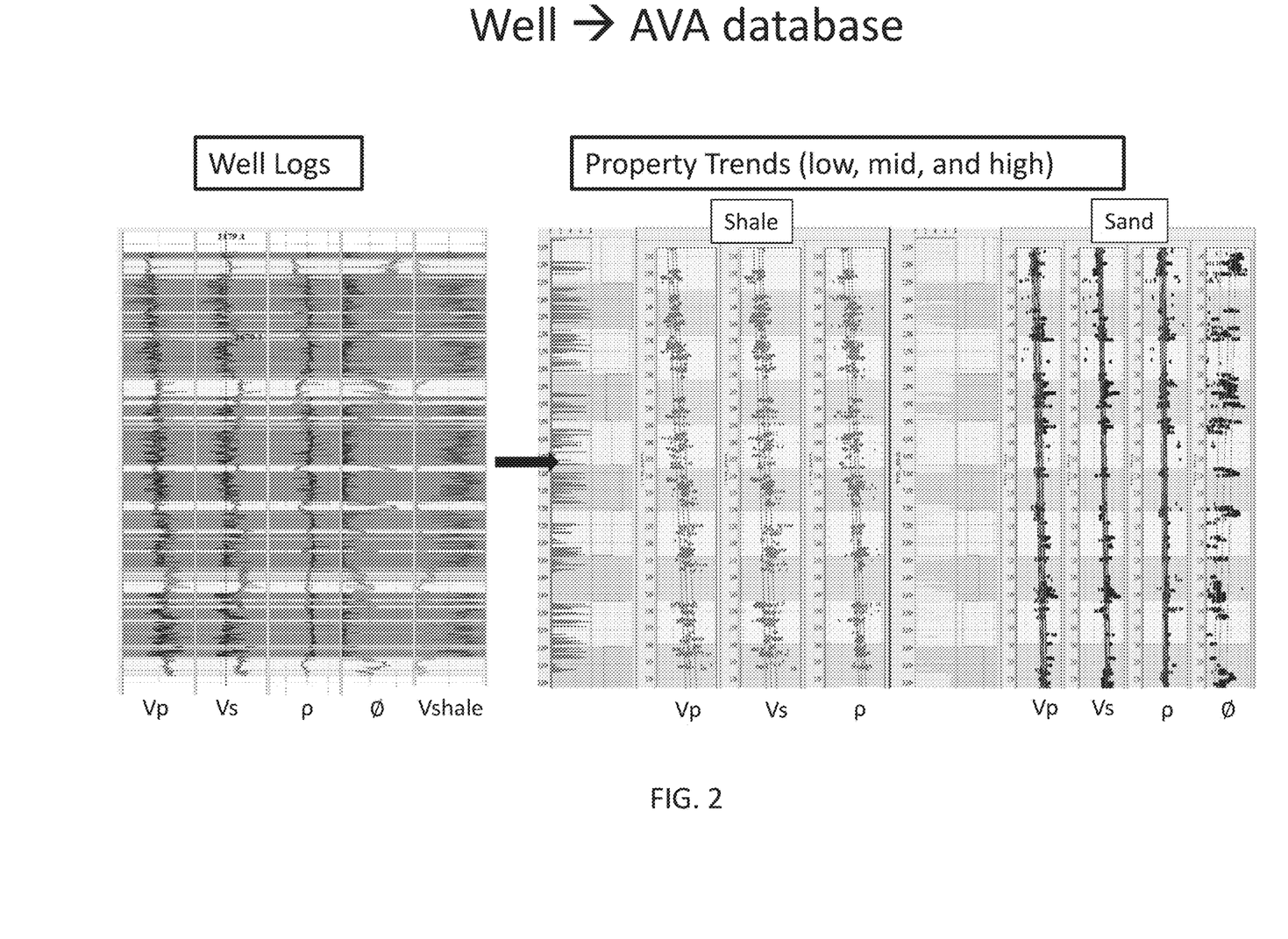
FIG. 2 illustrates a step of a method of seismic inversion.

FIG. 1 illustrates a method of seismic inversion 100 using a global AVA database. The first process generates an AVA database that is used as training data for a machine-learning algorithm to train an AVA model. It begins at operation 10 by obtaining well logs. The well logs can be from any wells in any part of the world, unlike conventional methods that require well logs from the same or analogous subterranean rock formations. The well logs may include any type of data but should include at least two of P-wave velocity ($V_P$), shear wave velocity ($V_S$), density ($\rho$), porosity ($\emptyset$), and proportion of shale ($V_{shale}$), examples of which are shown in FIG. 2. In an embodiment, hundreds or thousands of well logs may be obtained from around the world.

Referring again to FIG. 1, operation 11 generates the AVA database. It is desirable to have more information than that which is provided by the well logs obtained in operation 10. This can be accomplished by using the well logs as a starting point to create realistic new well logs that can then be used in seismic modeling. As seen in FIG. 2, the obtained well logs can be analyzed to identify low, mid, and high property trends. In the property trends, the lithologies (shale and sand) are separated with the low, mid, and high trends for the $V_P$, $V_S$, and $\rho$ and, for the sand, the $\emptyset$.

Figure 3:
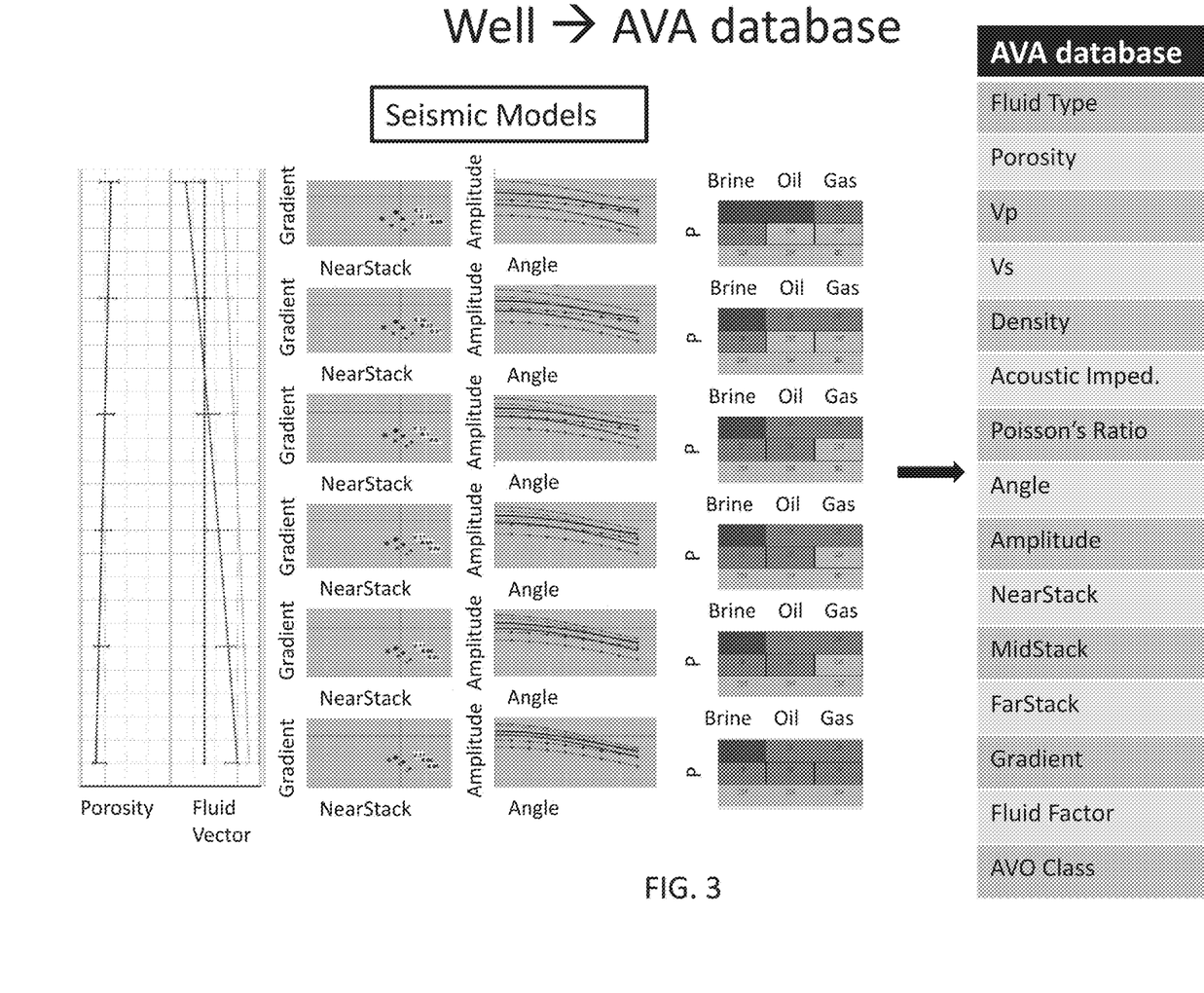
FIG. 3 illustrates a step of a method of seismic inversion.

These well logs with the property trends are then used for seismic modeling to generate seismic angle gathers. Those of skill in the art are familiar with methods and software to perform seismic modeling of well logs. In addition to having the low, mid, and high property trends, it is possible to do fluid substitution during the seismic modeling wherein the fluid in the rock formation is modeled to be different fluids—brine (water), oil, or gas which will impact the AVA behavior. As seen in FIG. 3, the seismic modeling uses the well logs as modified by the property trends and the fluid substitution to generate seismic data including the amplitude variation with angle, the near stack value, the mid stack value, the far stack value, and the gradient. All of the information about the well logs (e.g., lithology, pore fluid type, porosity, sonic velocity, shear wave velocity, density, etc.) and the synthetic seismic modeling is stored in the AVA database. The synthetic seismic models are generated by computing reflectivity using Zoeppritz equation and then convolving the reflectivity with a wavelet (e.g., Ricker wavelet).

Referring again to FIG. 1, at operation 12 the information stored in the AVA database is used as training data to train an AVA model. In an embodiment, the AVA model may be a neural network. In an embodiment, the model building may split the whole dataset into 80% training and 20% testing data. We use a 5-fold cross validation to tune the hyper parameters of an XGB regressor by simple grid search. We need be careful not to overfit the data using very complex models. After settling on some optimal model parameters, we train the model, which is then evaluated using the 20% test data that are unseen by the training process.

Figure 4:
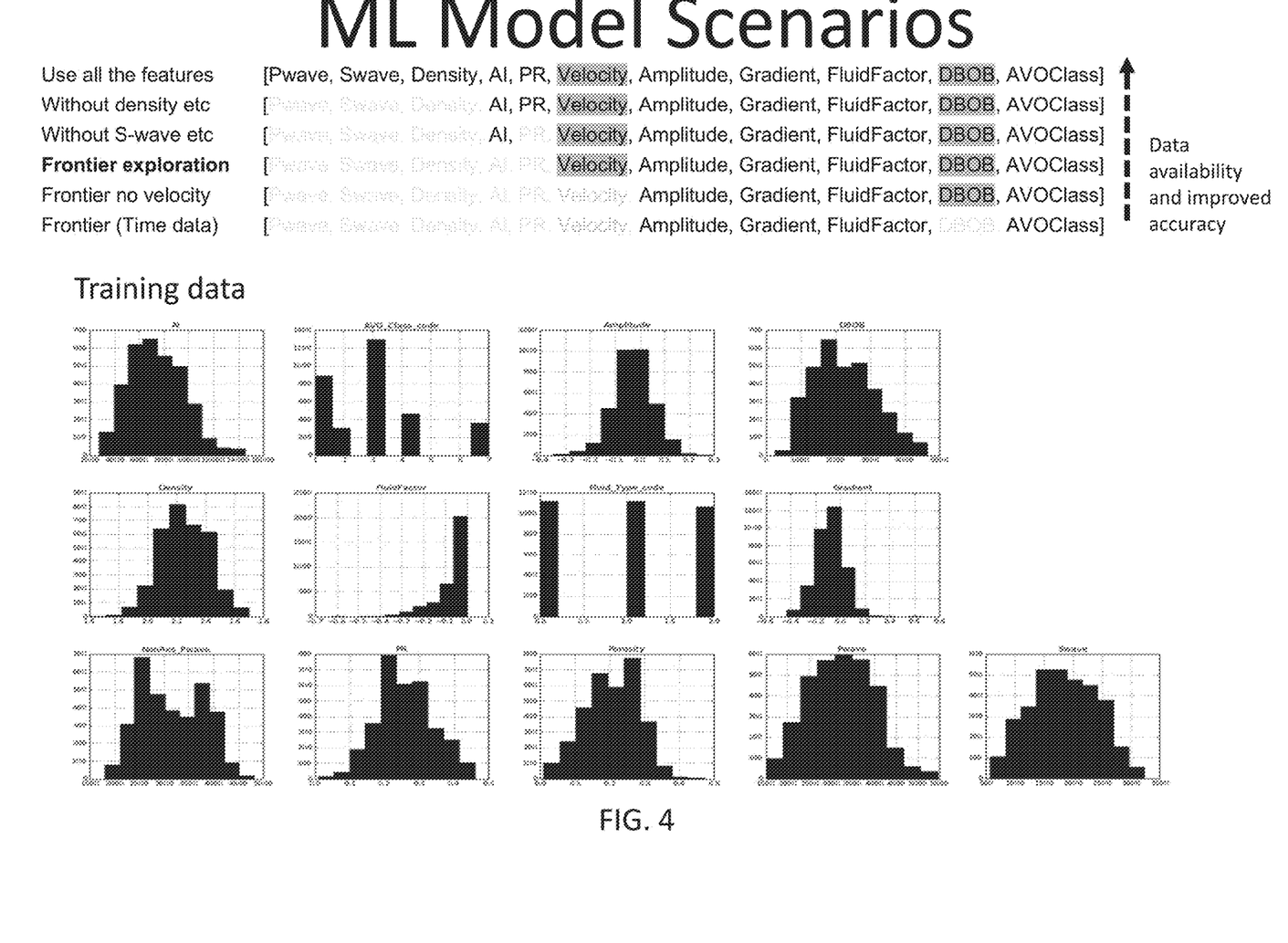
FIG. 4 illustrates a step of a method of seismic inversion.

FIG. 4 demonstrates the power of the machine-learning model with respect to the available data. In frontier areas, the only data may be time-migrated seismic data from which amplitude, gradient, fluid factor, and AVO class can be extracted. There may also be depth migrated seismic data where we can use depth below ocean bottom (DBOB) as an additional feature. For frontier exploration, it is likely that there will also be migration velocity data available. In a matured basin where more data is available, it may be possible to add acoustic impedance (AI) and Poisson's ratio (PR) features computed by traditional seismic inversion. When all data is available, the machine-learning model can use $V_P$, $V_S$, and $\rho$ in addition to all of the other seismic attribute data.

Figure 5:
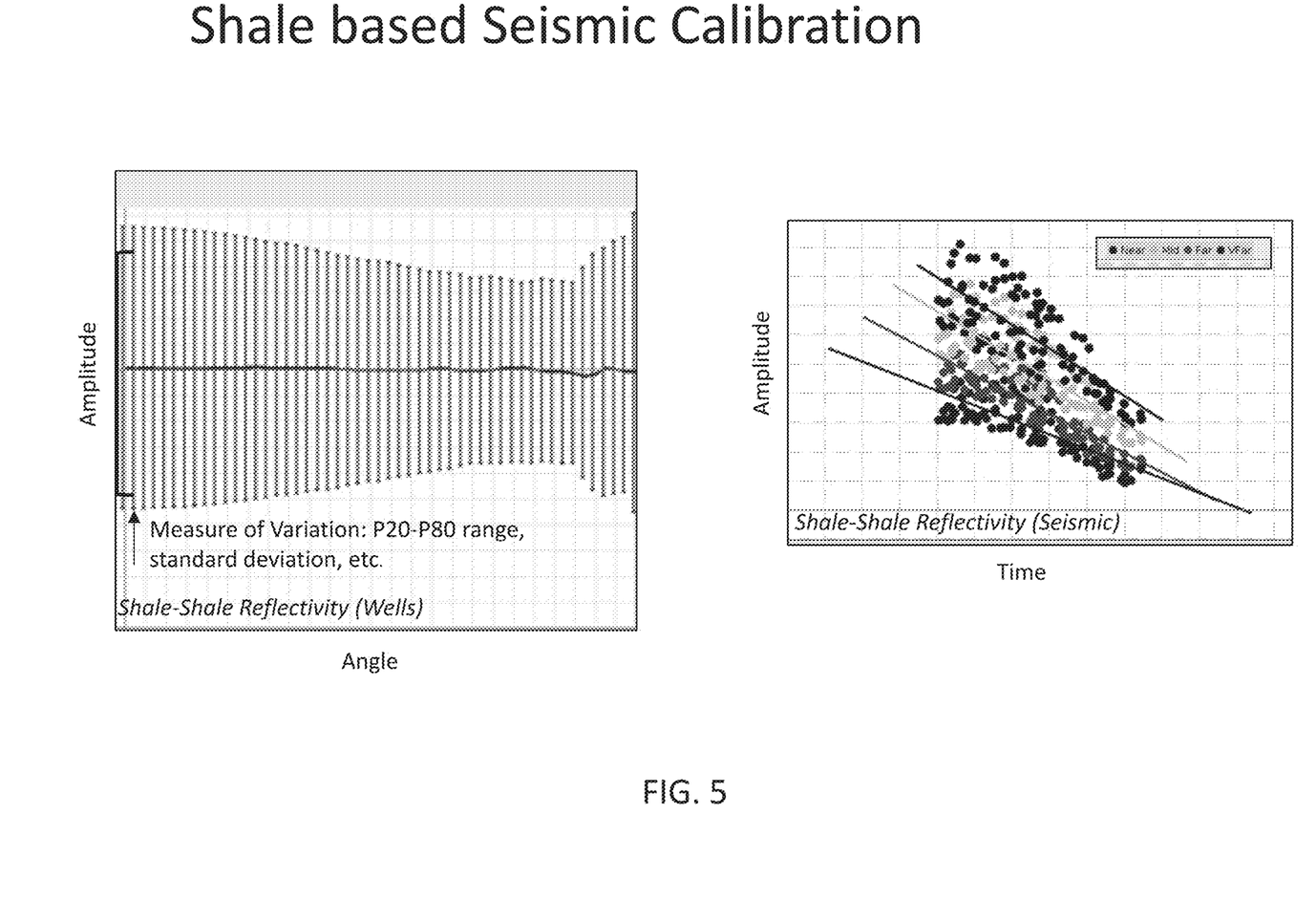
FIG. 5 illustrates a step of a method of seismic inversion.
Figure 6:
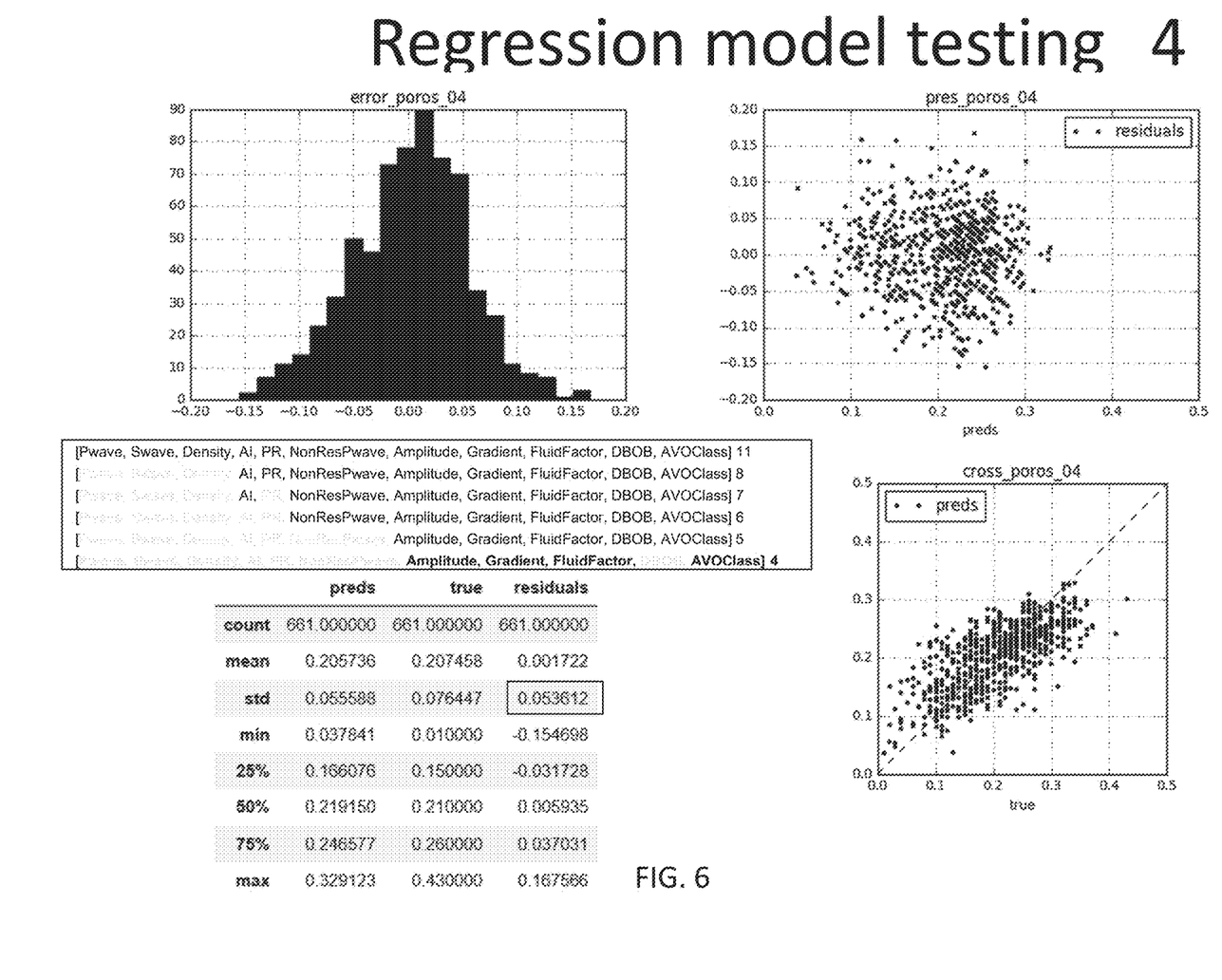
FIG. 6 illustrates a step of a method of seismic inversion.
Figure 7:
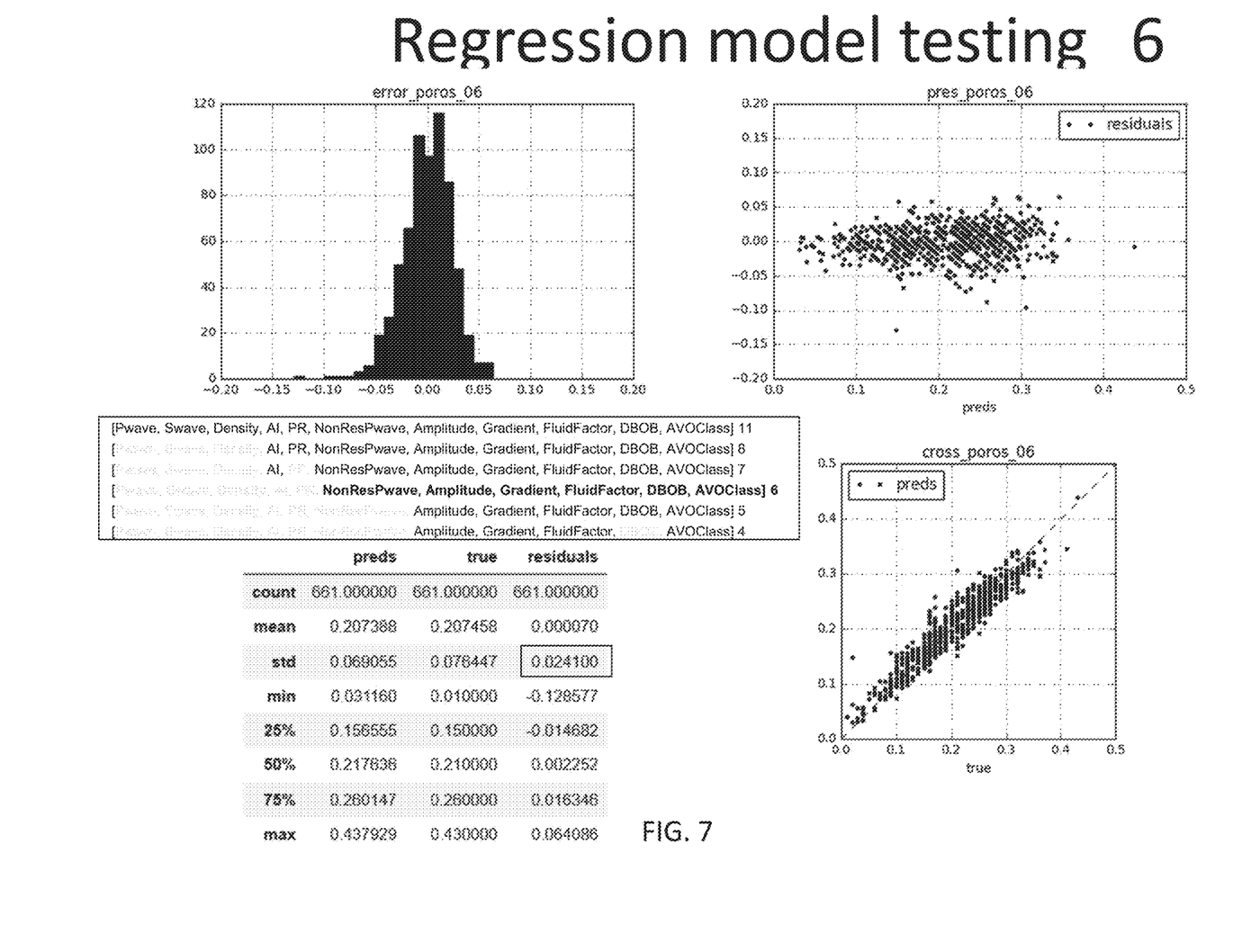
FIG. 7 illustrates a step of a method of seismic inversion.
Figure 8:
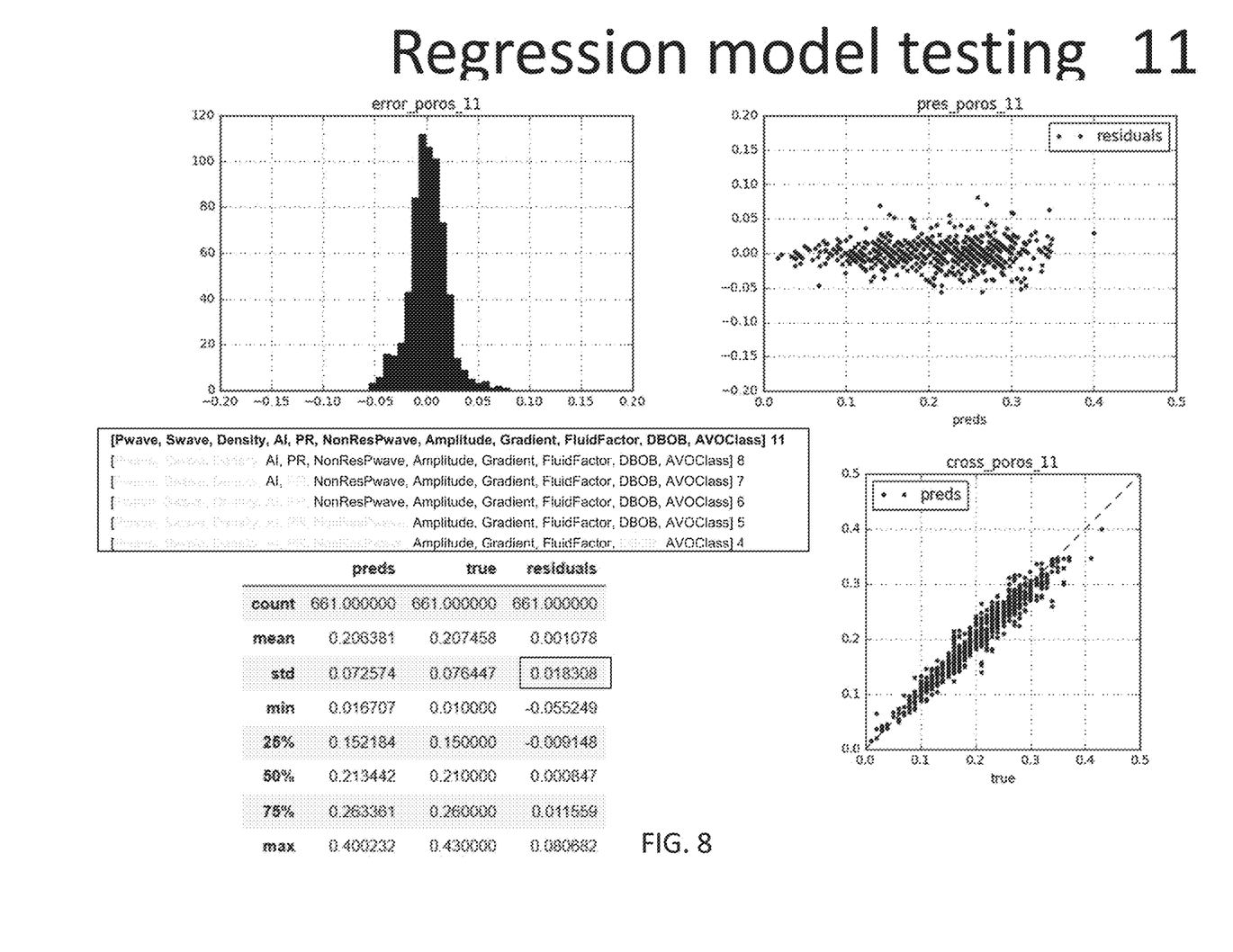
FIG. 8 illustrates a step of a method of seismic inversion.
Figure 9:
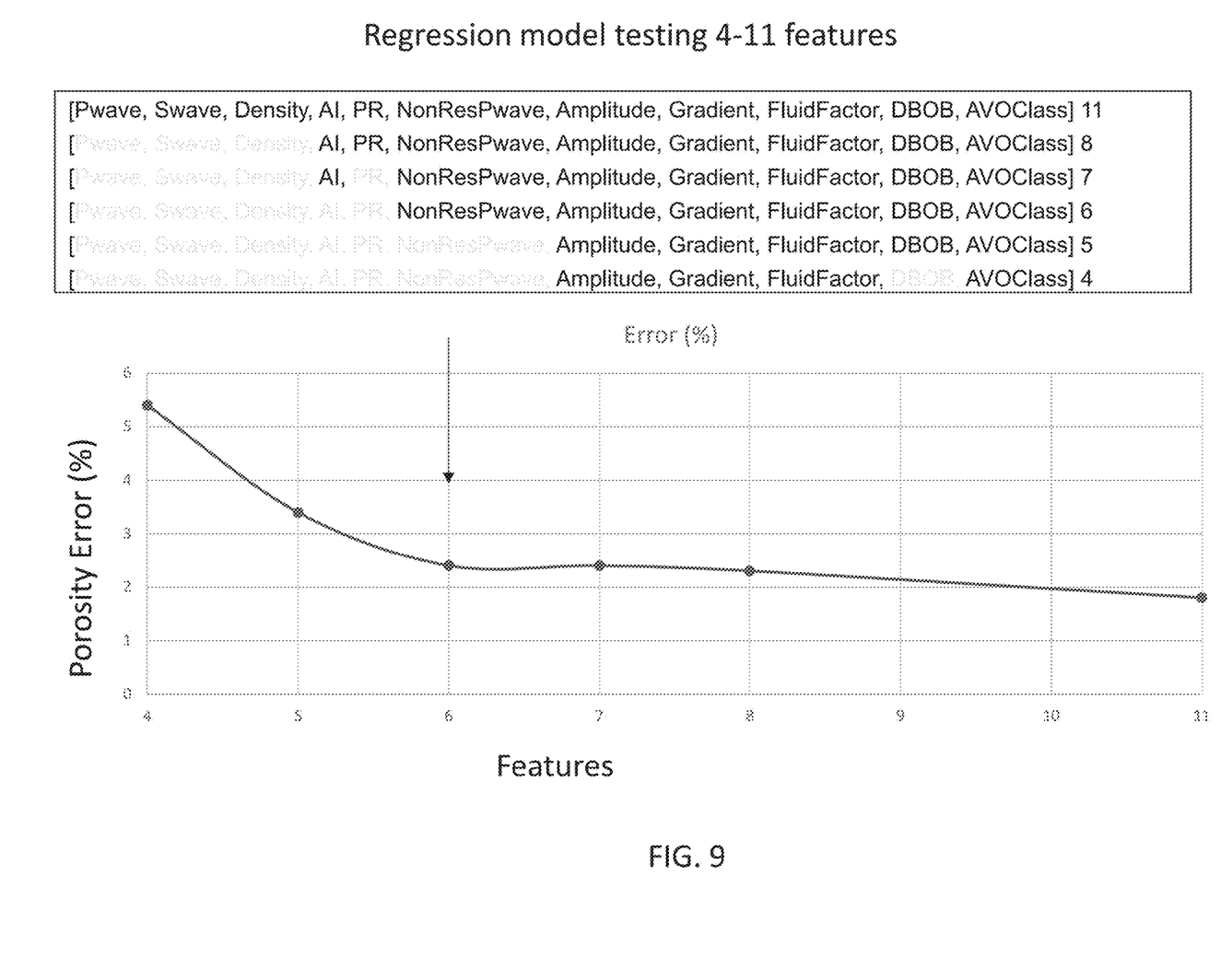
FIG. 9 illustrates a step of a method of seismic inversion.

At operation 14, a seismic dataset is obtained. This seismic dataset is a pre-stack seismic dataset or a seismic dataset of partial stacks such as near, mid, and far stacks. At operation 15, the seismic dataset is calibrated. This is shown, for example, in FIG. 5. In an embodiment, the calibration may be done based on shale-shale reflectivity. Shale intervals are common and relatively easy to identify in seismic data as regional features with low reflectivity. Shale-shale reflectivity has a systematic AVA response that can be exploited for efficient and accurate seismic calibration. As seen in FIG. 5, the shale-shale interface has symmetric amplitude distribution with zero mean and decreasing measure of variation with angle (dimming).

Referring again to FIG. 1, at operation 16 the method calculates seismic attributes for the calibrated seismic dataset. In an embodiment, this may be done using standard z-score statistics. We perform a hierarchical classification of the AVA anomalies by taking any two angles or angle stacks (e.g., Near Stack and Far Stack) and computing z-scores for all sub-cubes. The z-scores are used to statistically identify AVA anomalies and classify into standardized AVA classes using the following hierarchical sequence:

$$\text{Class} = \begin{cases} 0: & \text{if } |z| < 2 \text{ AND zero amplitude lies between } P30 \text{ and } P70 \text{ of sample amplitudes } pdf \\ 99: & \text{else} \end{cases}$$

Then estimating the intercept and gradient by, for example, fitting the Shuey approximation:

$$R(\theta)=A+B\,\text{Sin}^2\theta+C\,\text{Sin}^2\theta\,\text{Tan}^2\theta$$

So that the AVA classification can then be made from:

Class =

$$\begin{cases} 1: & A \gg 0 \text{ AND } AVA \text{ Curve crossing } Y = 0 \text{ at greater than } 20° \\ 2n: & A < 0 \text{ AND } B < 0 \\ 2p: & A > 0 \text{ AND } B < 0 \\ 3: & A \ll 0 \text{ AND } B < 0 \\ 4: & A \ll 0 \text{ AND } B > 0 \\ 5: & A > 0 \text{ AND } B > 0 \\ 6: & A \gg 0 \text{ AND } B > 0 \end{cases}$$

Method 100 then performs operation 18 wherein the trained AVA model is applied to the calculated seismic attributes to generate the inverted lithology, porosity, and/or fluid content. The lithology, porosity, and/or fluid content are used as direct hydrocarbon indicators.

FIGS. 6-9 demonstrate the impact of ML results for predicting porosity and fluid type using more features. As shown, adding more features improves the quality of results.

Figure 10:
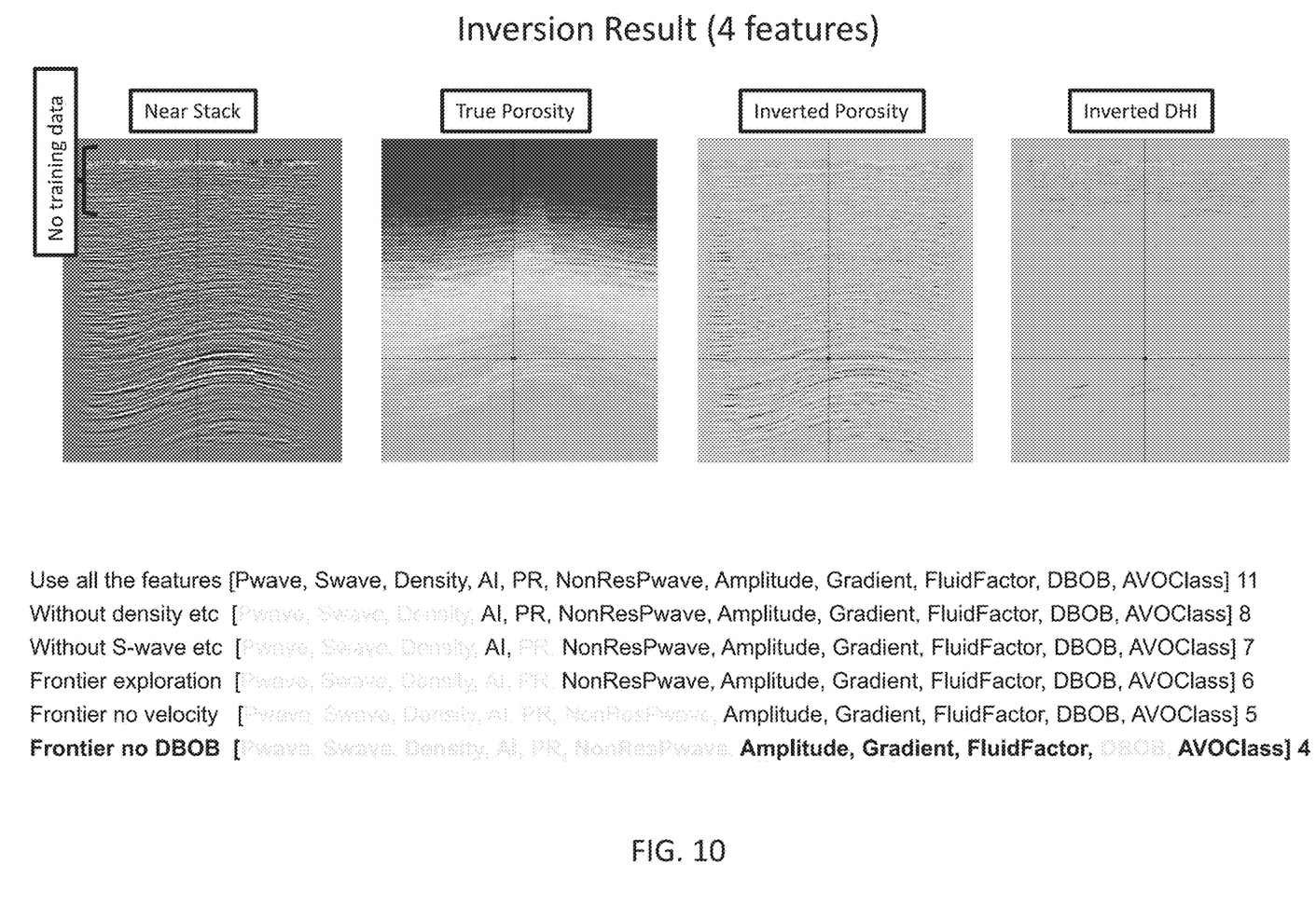
FIG. 10 illustrates a result of a method of seismic inversion.
Figure 11:
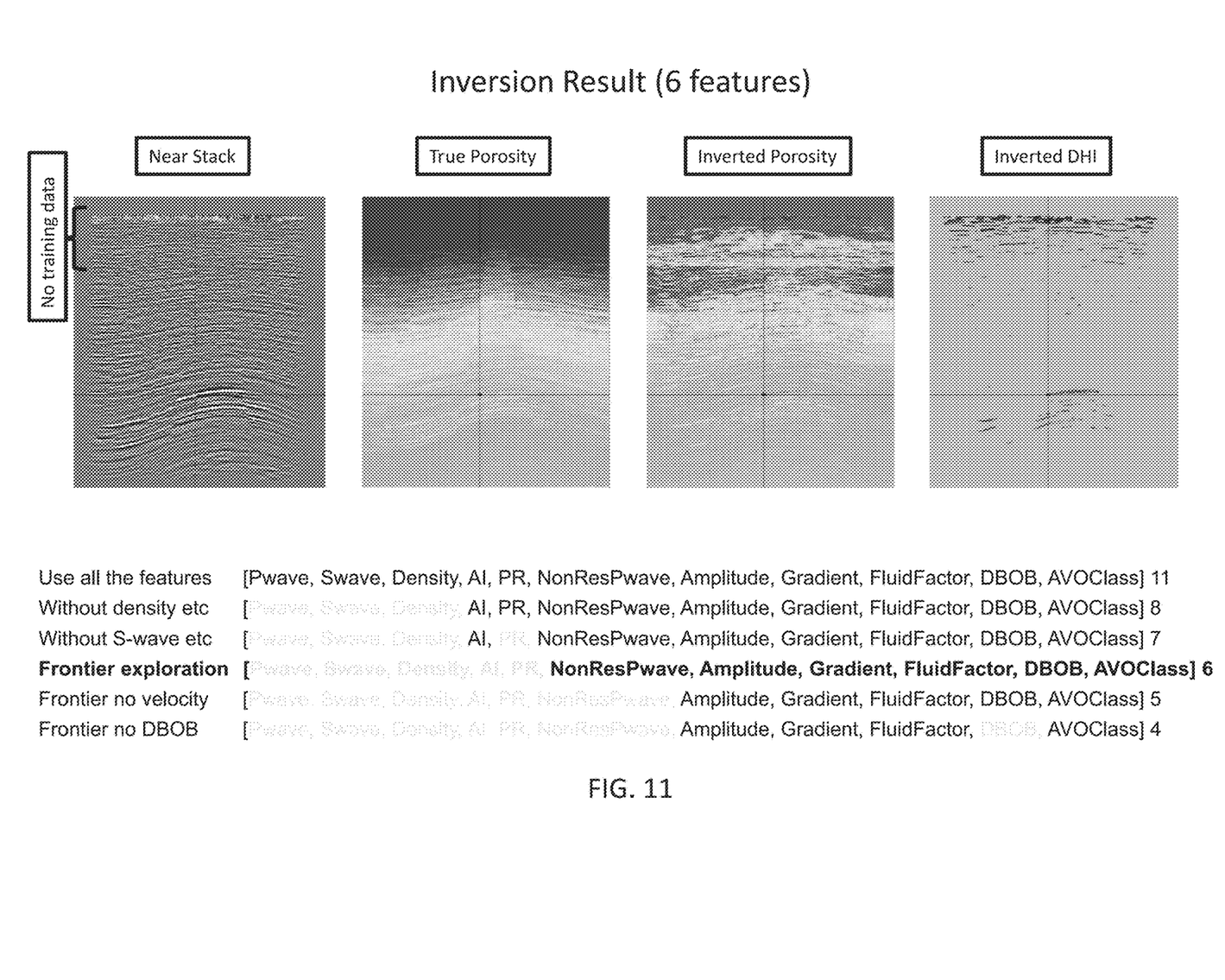
FIG. 11 illustrates a result of a method of seismic inversion.

FIGS. 10 and 11 show the results of seismic inversion using the trained AVA model for two frontier scenarios. FIG. 10 shows the result using a minimum set of seismic data. i.e., time migrated seismic data (4 features). FIG. 11 includes depth migrated seismic data with migration velocity (6 features) as input.

Figure 12:
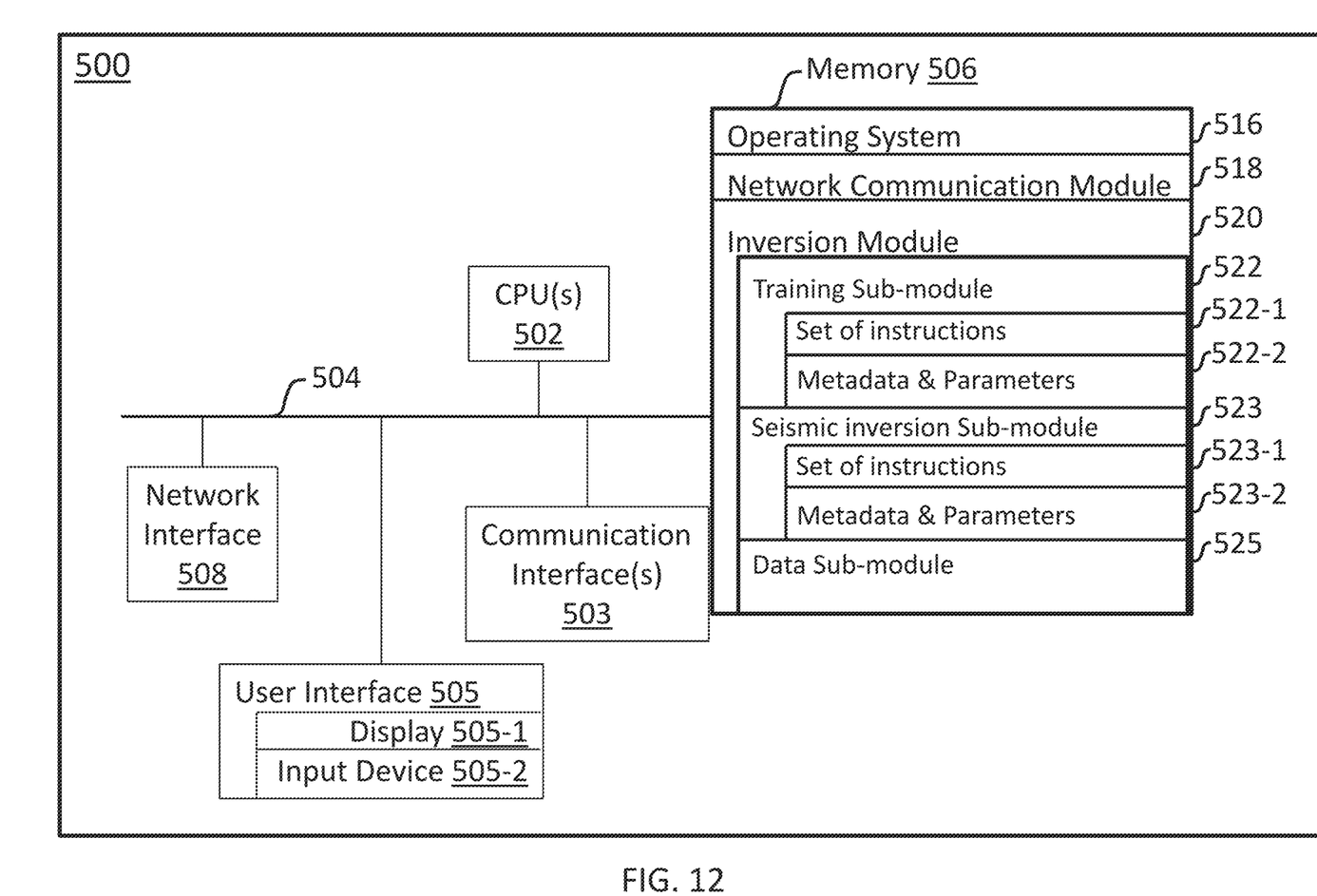
FIG. 12 is a block diagram illustrating a seismic inversion system, in accordance with some embodiments.

FIG. 12 is a block diagram illustrating a seismic inversion system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic inversion system 500 includes one or more processing units (CPUs) 502, one or more network interfaces 508 and/or other communications interfaces 503, memory 506, and one or more communication buses 504 for interconnecting these and various other components. The seismic inversion system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and an inversion module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the inversion module 520 executes the operations described above. Inversion module 520 may include data sub-module 525, which handles the seismic dataset. This seismic data is supplied by data sub-module 525 to other sub-modules.

Training sub-module 522 contains a set of instructions 522-1 and accepts metadata and parameters 522-2 that will enable it to execute the training of the machine learning algorithm as described above as operations 11 and 12. The seismic inversion sub-module 523 contains a set of instructions 523-1 and accepts metadata and parameters 523-2 that will enable it to use the training ML algorithm to obtain reservoir properties from seismic data as described in operations 15, 16, and 18. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

The method is, optionally, governed by instructions that are stored in computer memory or a non-transitory computer readable storage medium (e.g., memory 506 in FIG. 12) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for training an amplitude variation with angle (AVA) model to generate direct hydrocarbon indicators as a function of position in a subsurface volume of interest, the method being implemented in a computer system that comprises a computer processor and non-transient storage medium, the method comprising:
   a. obtaining, from the non-transient storage medium, well logs representative of subsurface volumes of interest;
   b. generating, via the computer processor, an amplitude variation with angle (AVA) database from the well logs by seismic modeling, wherein the seismic modeling is performed a plurality of times for all combinations of fluid substitutions of brine, oil, and gas and low porosity, mid-porosity, and high porosity;
   c. generating, via the computer processor, a trained AVA model using the AVA database;
   d. storing the trained AVA model in the non-transient storage medium;
   e. obtaining, from the non-transient storage medium, a seismic dataset representative of a particular subsurface volume of interest;
   f. calibrating, via the computer processor, the seismic dataset to generate a calibrated seismic dataset;
   g. computing, via the computer processor, seismic attributes for the calibrated seismic dataset using statistics for AVA classification, wherein the seismic attributes include intercept, gradient and normal vectors; and
   h. generating, with the computer processor, direct hydrocarbon indicators as a function of position in the subsurface volume of interest by applying the trained AVA model to the seismic attributes.

2. The computer-implemented method of claim 1 wherein the well logs include at least two of P-wave velocity, shear wave velocity, density, porosity, and $V_{shale}$.

3. The computer-implemented method of claim 1 wherein the direct hydrocarbon indicators are at least two of lithology, porosity, and fluid type.

4. The computer-implemented method of claim 1 wherein the seismic modeling generates features including at least one of intercept, gradient, AVA class, Normal Vector, Shale Velocity, Acoustic Impedance, Poisson Ratio, and Density, and wherein the features are stored in the AVA database.

5. The computer-implemented method of claim 1 wherein the seismic dataset is comprised of partial angle stacks.

6. The computer-implemented method of claim 1 wherein the statistics are standard z-score statistics.

7. The computer-implemented method of claim 1 further comprising:
   a. obtaining, from the non-transient storage medium, additional attributes; and
   b. using the additional attributes in addition to the trained AVA model to generate the direct hydrocarbon indicators as a function of position in the subsurface volume of interest.

8. The computer-implemented method of claim 7 wherein the additional attributes are at least one of seismic inversion products and a velocity model.

9. A computer system, comprising:
   a computer processor;
   non-transient storage medium; and
   one or more programs, wherein the one or more programs are stored in the non-transient storage medium and configured to be executed by the computer processor, the one or more programs including instructions that when executed by the one or more processors cause the system to:
   a. obtain, from the non-transient storage medium, well logs representative of subsurface volumes of interest;
   b. generate, via the computer processor, an amplitude variation with angle (AVA) database from the well logs by seismic modeling, wherein the seismic modeling is performed a plurality of times for all combinations of fluid substitutions of brine, oil, and gas and low porosity, mid-porosity, and high porosity;
   c. generate, via the computer processor, a trained AVA model using the AVA database; and d. store the trained AVA model in the non-transient storage medium;

e. obtaining, from the non-transient storage medium, a seismic dataset representative of a particular subsurface volume of interest;

f. calibrating, via the computer processor, the seismic dataset to generate a calibrated seismic dataset;

g. computing, via the computer processor, seismic attributes for the calibrated seismic dataset using statistics for AVA classification, wherein the seismic attributes include intercept, gradient and normal vectors; and h. generating, with the computer processor, direct hydrocarbon indicators as a function of position in the subsurface volume of interest by applying the trained AVA model to the seismic attributes.

10. The computer system of claim 9 wherein the well logs include at least two of P-wave velocity, shear wave velocity, density, porosity, and $V_{shale}$.

11. The computer system of claim 9 wherein the direct hydrocarbon indicators are at least two of lithology, porosity, and fluid type.

12. The computer system of claim 9 wherein the seismic modeling generates features including at least one of intercept, gradient, AVA class, Normal Vector, Shale Velocity, Acoustic Impedance, Poisson Ratio, and Density, and wherein the features are stored in the AVA database.

13. The computer system of claim 9 wherein the seismic dataset is comprised of partial angle stacks.

14. The computer system of claim 9 wherein the statistics are standard z-score statistics.

15. The computer system of claim 9 further comprising:

a. obtaining, from the non-transient storage medium, additional attributes; and b. using the additional attributes in addition to the trained AVA model to generate the direct hydrocarbon indicators as a function of position in the subsurface volume of interest.

16. The computer system of claim 15 wherein the additional attributes are at least one of seismic inversion products and a velocity model.

* * * * *